United States Patent Office 2,748,095
Patented May 29, 1956

2,748,095

FOILS AND COATINGS FROM MIXTURES OF PASTES OF VINYL CHLORIDE POLYMERS AND PLASTICIZERS AND AQUEOUS PARAFFIN WAX EMULSIONS

August Kling, Mannheim, Germany, assignor to Badische Anilin- & Soda-Fabrik Aktiengesellschaft, Ludwigshafen (Rhine), Germany No Drawing. Application March 4, 1953,
Serial No. 340,381

Claims priority, application Germany March 13, 1952

7 Claims. (Cl. 260—28.5)

This invention relates to improved foils and coatings from pastes from vinyl chloride polymers and plasticizers and to the pastes for producing said foils and coatings.

Self-supporting foils and coatings on fibrous materials of various kinds, such as artificial leather, can be prepared from pastes of pulverulent vinyl chloride polymers, i. e. polyvinylchloride or interploymers from preponderating amounts of vinyl chloride and smaller amounts of other compounds having an ethylenic unsaturation, in plasticizers. The said artificial leather, especially when it contains a large amount of plasticizers for obtaining a high stability to cold, has, however, a surface having a somewhat cold, moist and sticky feel. Moreover it has a greasy gloss which is usually not desired. The superficial gloss may be removed by subsequent mechanical roughening (roughened dulling or graining rollers), but the cold, moist, sticky handle remains.

I have now found that foils and coatings having a mat, dry surface with a dry, leatherlike handle are obtained by adding to the polyvinyl chloride pastes, before they are processed, aqueous emulsions of paraffin waxes, the emulsions preferably being of about 20 to 60% strength. The amounts of paraffin wax employed practically range from 1 to 10 per cent of the amounts of the pastes. These emulsions may also contain small amounts of high molecular weight alcohols, and also oils, waxes, resins and the like.

Especially good effects are obtained when such emulsions are combined with oxides or hydroxides of metals of the second to fourth groups of the periodic system, preferably aluminum hydroxides colloidally soluble in water. These emulsions are homogeneously dispersed in the pastes by stirring in. All plasticizers suitable for polyvinyl chloride can be used for the production of the pastes. The processing of the pastes to which the emulsions have been added is carried out in the usual manner. Besides the desired dry, mat surface with leather-like handle, there is obtained also the further advantage that the foils and coatings become water-repellent. Water runs off therefrom in drops, and this is important for the employment of the products for protective clothing against rain. Moreover there is no tendency for the paste to penetrate through fabrics.

The following examples will further illustrate this invention but the invention is not limited to these examples. The parts are by weight.

Example 1

10 parts of a 60% paraffin wax emulsion are added to a paste of 55 parts of polyvinyl chloride and 45 parts of a plasticizer mixture consisting of dioctyl phthalate and adipic acid diethylhexyl ester in the ratio 1:1. After applying the paste to fabric and heating to 160° C. an artificial leather is obtained having a mat, dry and non-sticky surface.

Example 2

14 parts of a 40% paraffin wax emulsion are added to a paste of 50 parts of polyvinyl chloride and 50 parts of a plasticizer mixture consisting of dibutyl phthalate, tricresyl phosphate and the esters of aliphatic $C_6$—$C_7$ fatty acids and triglycol in the ratio of 1:1:1. After the mixture sprayed on a metal surface has gelatinised out, a film with a mat, dry, non-sticky surface is obtained.

Example 3

10 parts of a 50% paraffin wax emulsion are added to a paste of 60 parts of an interpolymer of about 80 per cent of vinyl chloride with vinyl acetate or acrylic acid methyl ester or vinylidene chloride and 40 parts of a plasticizer. After the paste has been applied and allowed to gelatinise out, a film is obtained having a mat, dry and non-sticky surface.

Similar products are obtained with pastes of 65 parts of the said interpolymers, 35 parts of plasticizer and 5 parts of the said paraffin wax emulsion.

I claim:

1. A composition for the production of foils and coatings comprising a pulverulent linear vinyl chloride polymer containing a preponderate proportion of vinyl chloride dispersed in a plasticizer therefor, the ingredients of the dispersion being present in amounts such that the dispersion is a paste at atmospheric temperature, and an aqueous paraffin wax emulsion dispersed therein in an amount providing a paraffin wax content of about 1% to 10% by weight of the amount of said polymer and plasticizer, said emulsion having a liquid content such that the resulting dispersion is a paste at atmospheric temperature.

2. A composition for the production of foils and coatings comprising pulverulent polyvinyl chloride dispersed in a plasticizer therefor, the ingredients of the dispersion being present in amounts such that the dispersion is a paste at atmospheric temperature, and an aqueous paraffin wax emulsion dispersed therein in an amount providing a paraffin wax content of about 1% to 10% by weight of of the amount of said polyvinyl chloride and plasticizer, said emulsion having a liquid content such that the resulting dispersion is a paste at atmospheric temperature.

3. A composition for the production of foils and coatings comprising a pulverulent linear copolymer of at least about 80% of vinyl chloride and the balance of another monovinyl compound, dispersed in a plasticizer for the polymer, the ingredients of the dispersion being present in amounts such that the dispersion is a paste at atmospheric temperature, and an aqueous paraffin wax emulsion dispersed therein in an amount providing a paraffin wax content of about 1% to 10% by weight of the amount of said polymer and plasticizer, said emulsion having a liquid content such that the resulting dispersion is a paste at atmospheric temperature.

4. A composition for the production of foils and coatings comprising a pulverulent linear polymer containing at least about 80% of vinyl chloride, the balance being a compound selected from the group consisting of vinyl acetate, acrylic acid methyl ester and vinylidene chloride, dispersed in a plasticizer for the polymer, the weight ratio of said polymer to said plasticizer being about 50:50 to 65:35, and an aqueous paraffin wax emulsion containing about 20% to 60% of wax by weight dispersed in said polymer and plasticizer dispersion in an amount providing a paraffin wax content of about 1% to 10% by weight of the amount of said polymer and plasticizer, the liquid content of said emulsion being such that the resulting dispersion is a paste at atmospheric temperature.

5. In a process for the production of foils and coatings, the steps which comprise dispersing a pulverulent linear vinyl chloride polymer containing a preponderate proportion of vinyl chloride in a plasticizer therefor, the ingredients of the dispersion being employed in amounts such that the dispersion is a paste at atmospheric temperature, dispersing an aqueous paraffin wax emulsion therein in an amount providing a paraffin wax content of about 1% to 10% by weight of the amount of said polymer and plasticizer, the liquid content of said emulsion being such that the resulting dispersion is a paste at atmospheric temperature, applying the resulting dispersion to a surface to be coated, and heating the applied dispersion to gelatination temperature.

6. In a process for the production of foils and coatings, the steps which comprise dispersing pulverulent polyvinyl chloride in a plasticizer therefor, the ingredients of the dispersion being employed in amounts such that the dispersion is a paste at atmospheric temperature, dispersing an aqueous paraffin wax emulsion therein in an amount providing a paraffin wax content of about 1% to 10% by weight of the amount of said polyvinyl chloride and plasticizer, the liquid content of said emulsion being such that the resulting dispersion is a paste at atmospheric temperature, applying the resulting dispersion to a surface to be coated, and heating the applied dispersion to gelatination temperature.

7. In a process for the production of foils and coatings, the steps which comprise dispersing a pulverulent linear polymer containing at least about 80% of vinyl chloride, the balance being a compound selected from the group consisting of vinyl acetate, acrylic acid methyl ester and vinylidene chloride, in a plasticizer for the polymer, the weight ratio of said polymer to said plasticizer being about 50:50 to 65:35, dispersing an aqueous paraffin wax emulsion containing about 20% to 60% of wax by weight in said polymer and plasticizer dispersion in an amount providing a paraffin wax content of about 1% to 10% by weight of the amount of said polymer and plasticizer, the liquid content of said emulsion being such that the resulting dispersion is a paste at atmospheric temperature, applying the resulting dispersion to a surface to be coated, and heating the applied dispersion to gelatination temperature.

References Cited in the file of this patent

UNITED STATES PATENTS

| | | |
|---|---|---|
| 2,213,557 | Tisdale | Sept. 3, 1940 |
| 2,404,519 | Morrison et al. | July 23, 1946 |
| 2,596,960 | Schoenholz et al. | May 13, 1952 |

FOREIGN PATENTS

| | | |
|---|---|---|
| 660,361 | Great Britain | Nov. 7, 1951 |